3,060,120
LUBRICATING OIL COMPOSITIONS
Samuel B. Lippincott, Springfield, and Arnold J. Morway, Clark, N.J., assignors to Esso Research and Engineering Company, a corporation of Delaware
No Drawing. Filed Feb. 23, 1956, Ser. No. 567,072
6 Claims. (Cl. 252—32)

This invention relates to copolymerization and more particularly relates to copolymers of propylene with high molecular weight monoolefins. The invention also relates to the method of preparing such copolymers and to their uses.

The uses of polymeric materials in industry are well known. For example, polymeric materials have found wide application as synthetic rubbers, film-forming materials, lubricant additives, molded and extruded plastics and the like. Because of the rapid technological advancements being made in many fields today, there is a continuing need for the development of new and useful polymeric materials.

It has now been found that propylene can be polymerized with high molecular weight monoolefins to prepare high molecular weight copolymers which are useful as synthetic rubbers, plastics, film-forming materials, lubricant additives and the like. These copolymers may be prepared by reacting propylene with $C_{10}$ to $C_{24}$ monoolefins employing a polymerization catalyst obtained by mixing a reducing metal compound with a reducible metal compound. Generally, the copolymers of the present invention have molecular weights in the range of about 15,000 to 150,000.

The high molecular weight monoolefins which are copolymerized with propylene in accordance with the present invention are those containing in the range of 10 to 24, preferably 12 to 18 carbon atoms per molecule. Specific examples of these ethylenically unsaturated hydrocarbons include decene, hexadecene, octadecene, dodecene, tetradecene, olefins in the $C_{10}$–$C_{24}$ range obtained by the thermal cracking of paraffin wax or petroleum and similar olefins from the Fischer-Tropsch synthesis. It will be understood that mixtures of $C_{10}$ to $C_{24}$ monoolefins may also be employed in the present invention.

The novel copolymers of the present invention may be conveniently prepared by copolymerizing propylene with $C_{10}$ to $C_{24}$ monoolefin in the presence of a catalyst obtained by mixing a reducing metal compound with a reducible metal compound. More particularly, the reducing compound is preferably a compound of aluminium having the following general formula

where R and R′ are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. The preferred aluminum compounds are (1) dialkyl aluminum monohalides containing about 2 to 4 carbon atoms in the alkyl groups and chlorine or bromine atoms, particularly chlorine atoms, (2) aluminum trialkyls containing about 2 to 4 carbon atoms in the alkyl groups, and (3) mixtures of (1) and (2) in any proportions.

The reducible metal compound is one of a metal of groups IV–B, V–B, BI–B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chloride or bromides, oxy halides such as oxychlorides, complex halides such as complex fluorides, freshly precipitated oxides or hydroxides, organic compounds such as alcoholates, acetates, benzoates or acetyl acetonates. The preferred salts are those of titanium, zirconium, thorium, uranium and chromium. Titanium salts are particularly preferred such as titanium tetrachloride, titanium oxychloride or titanium acetyl acetonate.

The catalyst mixture is prepared simply by mixing the metal compound having reducing properties with the reducible heavy metal compound in the presence of an inert liquid diluent. Hydrocarbon diluents are particularly preferred, especially saturated aliphatic hydrocarbons containing about 5 to 10 carbon atoms, e.g., hexane and heptane. Also aromatic hydrocarbons, e.g., benzene, toluene, xylene, etc., may be employed. Halogenated hydrocarbons, e.g. chlorobenzene, may also be employed. The above-mentioned diluents are also useful in the copolymerization reaction itself. In general, at least about one mole of the metal compound having reducing properties will be mixed with a mole of the reducible metal compound. Preferably the molar ratio of the reducing metal compound to the reducible metal compound is in the range of about 1.5:1 to 8:1. The catalyst mixture is prepared preferably using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours.

The preferred catalyst mixtures employed for copolymerizing propylene with $C_{10}$ to $C_{24}$ monoolefins to prepare the copolymers of this invention are (1) catalysts obtained by mixing dialkyl aluminum monohalides with titanium tetrachloride, (2) catalysts obtained by mixing aluminum trialkyls with titanium tetrachloride and (3) mixtures of dialkyl aluminum monohalides and aluminum trialkyls with titanium tetrachloride. Preferably the alkyl groups in the aluminum compounds contain in the range of 2 to 4 carbon atoms and the halides are those of chlorine and bromine. Aluminum compounds containing ethyl groups as the alkyl groups are particularly preferred.

Generally it is desirable to carry out the present copolymerization reaction with the above-described catalysts using an inert liquid diluent. The amount of the inert liquid diluent employed in the copolymerization process should be such that the final polymeric product in the reaction mixture does not exceed about 40 weight percent so that a relatively fluid reaction mixture is produced. Preferably the amount of inert diluent is such that the polymeric product in the final reaction mixture is in the range of about 1% to 25% by weight. The proportion of catalyst based on the inert liquid diluent will generally be in the range of about 0.05 to 0.5 weight percent, preferably about 0.1 to 0.3 weight percent. Prior to the copolymerization reaction, it is preferred to purify the propylene and $C_{10}$ to $C_{24}$ monoolefins of undesirable poisons such as oxygen, carbon monoxide, water, acetylene, etc. by passing the monomers through aluminum trialkyl.

The copolymerization reaction is carried out generally at a temperature in the range of about 40° to 120° C., preferably about 50° to 80° C. Reduced, atmospheric pressure, or elevated pressures may be employed in the copolymerization reaction. For example, pressures as high as 2,000 p.s.i.g or higher may be employed. Pressures of about 100 to 1500 p.s.i.g. are preferred. Generally reaction times of about 0.1 to 100 hours, preferably about 0.5 to 10 hours (e.g., 2 to 8 hours), will be employed. Longer times effect a higher percent conversion of monomers.

Upon completion of the polymerization reaction, the reaction mixture is preferably quenched by the addition thereto of acetone or an alcohol such as isopropyl alcohol, butyl alcohol and the like. These quenching agents deactivate the polymerization catalyst. The addition of the quenching agents such as alcohol also precipitates the copolymeric product from the inert liquid hydrocarbon diluent (if the copolymeric product is soluble therein). The copolymer may then be recovered from the quenched reaction mixture by filtration, washed with a washing agent such as an alcohol, e.g., isopropyl alcohol, and then dried such as by heating under vacuum at a temperature of about 50° to 212° F.

The copolymers of the present invention are branched and are thus compatible with other hydrocarbon polymeric materials such as, for example, polyisobutylene, butyl rubber, etc. Generally, the copolymers of the present invention have molecular weights in the range of about 15,000 to 150,000. The molecular weights referred to herein are those obtained from the correlation of Harris in the Journal of Polymer Science, vol. 8, 361 (1952). The higher molecular weight copolymers are generally less soluble in hydrocarbon oils than are the lower molecular weight copolymers. However, the higher molecular weight copolymers, that is, those having molecular weights above about 50,000, may be readily dispersed in hydrocarbon oils by heating at elevated temperatures followed by subsequent cooling to room or atmospheric temperatures. Even the high molecular weight copolymers of the present invention are soluble to the extent of at least about 1 weight percent in hydrocarbon oils. Thus the molecular weight of the copolymers will govern their specific applications in hydrocarbon oils. Generally the copolymers of the present invention will contain as constituent monomers (a) $C_{10}$ to $C_{24}$ monoolefins and (b) propylene in the molar ratio of about 0.5:1 to 8:1, preferably in the molar ratio of 1:1 to 5:1. Copolymers containing these constituent monomers in the molar ratio of 2:1 to 4:1 have been found to be particularly useful.

The copolymers of the present invention may be employed per se as synthetic rubbers, plastics, film-forming materials and the like. The copolymers may also be added to lubricants to prepare useful chassis lubricants and improved grease compositions. The copolymers may also be added to oils to prepare improved air filter coatings as well as to lubricating oils to improve the viscosity index and pour point thereof.

Copolymers of the present invention having molecular weights in the range of about 15,000 to 150,000 may be added to lubricating oil compositions. Generally, the proportions added will be in the range of about 0.1 to 10.0% by weight based on the total composition, the major proportion of the lubricating oil composition being a lubricating oil base stock. Mineral, synthetic, vegetable and/or animal oil base stocks may be employed in the lubricating oil compositions. The mineral oils employed in the present compositions are those of lubricating viscosity which are conventionally used in lubricating compositions. Synthetic oils such as di-2-ethyl hexyl sebacate, complex esters, formals and the like many also be employed. It will be understood that these lubricating oil compositions may also include other additives such as anti-oxidants (phenyl alpha naphthylamine), detergents (barium tert. octyl phenol sulfide), other viscosity index improvers, other pour depressants, dyes, corrosion inhibitors and the like. Copolymers having molecular weights in the range of about 15,000 to 50,000 are particularly preferred as viscosity index improvers and pour point depressants since such copolymers are quite soluble in the lubricating oils. However, copolymers having molecular weights in the range of 50,000 to 150,000 may be dissolved in mineral lubricating oils to the extent of about 1 to 2 weight percent and will also serve as pour depressants and viscosity index improvers. The copolymers of the present invention are usually added in an amount in the range of about 0.1 to 1.0% by weight to such lubricating oil compositions to thereby obtain good viscosity index improvement and pour point depressancy.

The higher molecular weight copolymers of the present invention, that is, those having molecular weights in the range of about 50,000 to 150,000, may be readily dispersed in oleaginous compositions in concentrations of about 2 to 5% or higher to prepare useful products. More specifically, the higher molecular weight copolymers may be dispersed in oils of lubricating viscosity such as mineral oils to prepare soft, semi-fluid, very adhesive products suitable for chassis lubrication in the new centralized system now employed on the Lincoln-Mercury cars and being evaluated by other car manufacturers. Another application of this copolymer-oil dispersion is as an air filter oil. The higher molecular weight copolymers may be readily dispersed in oleaginous products at the higher concentrations by simply heating a mixture of the copolymer and oleaginous product to a temperature in the range of about 200° to 400° F. for about 0.1 to 2 hours until the copolymer is thoroughly dispersed therein. The oleaginous composition may then be cooled to atmospheric or room temperature.

The copolymers of the present invention may also be added to lubricating grease compositions in concentrations preferably in the range of about 2 to 5 weight percent or higher. Preferably the high molecular weight copolymers are employed in this particular application. It has been found that the addition of the copolymer greatly increases the stringiness of soap-thickened greases. These lubricating greases to which the present copolymer is added generally contain a major proportion of a lubricating oil, e.g., mineral lubricating oil and minor proportions, e.g., 1 to 25 weight percent, of metal soaps and/or metal soap-salt complexes (e.g., having a molar ratio of salt to soap of about 1:1 to 25:1) and/or metal salts. These soaps and salts are well known in the art and are preferably prepared from fatty or carboxylic acids. The greases may also contain other thickeners such as carbon black, silica gel, clays and the like, as well as other additives such as anti-oxidants, corrosion inhibitors and the like. The soaps are generally formed from high molecular weight carboxylic acids (12 to 22 carbon atoms per molecule) whereas the salts are generally prepared from low molecular weight carboxylic acids (1 to 6 carbon atoms per molecule).

The metal component of the soaps, salts or complex soap-salt thickeners of this invention may be any grease-forming metal but is preferably an alkaline earth metal such as calcium, strontium, barium and magnesium, the preferred alkaline earth metal being calcium. Mixtures of the grease-forming metals may be employed if desired.

The invention will be more fully understood by reference to the following examples. It is pointed out, however, that the examples are given for the purpose of illustration only and are not to be construed as limiting the scope of the present invention in any way.

EXAMPLE I

*Copolymerization of Propylene With Hexadecene*

The copolymerization of propylene with hexadecene in this example was carried out using the following general procedure. The copolymerization was carried out in a heavy nickel-free stainless steel reactor, type 410 (13% Cr), sealed with a copper gasket. Agitation was obtained by rocking the reactor back and forth during the reaction by means of an electric motor. A thermocouple well in the reactor made it possible to record temperatures throughout the run and also to control temperature by means of a Celectray.

Connected to the reactor by means of high pressure stainless steel tubing and a high pressure stainless steel valve was a stainless steel reservoir in which the monomers could be collected as a liquid and which, in turn, was connected to a cylinder of nitrogen by means of stainless steel tubing and valve, so that the liquid monomers could be forced into the reactor by means of nitrogen pressure.

In operation the reactor was placed in a nitrogen filled dry box together with the solutions and equipment needed for preparation and transfer of the catalyst and solvent. One solution was titanium tetrachloride in n-heptane (160 g./l.). The other solution, also in n-heptane, contained 100 g./l. of a mixture containing about 87% triethylaluminum, the remainder being, largely, diethylaluminum bromide. After all air had been displaced with nitrogen the catalysts were prepared by mixing 10 ml. of the titanium tetrachloride solution with 57 ml. of the triethylaluminum solution and shaking. A brown-black precipitate formed which was transferred to the reactor along with the mother liquor. 10 ml. of n-heptane were used as a rinse.

In the meantime the feed reservoir was charged with 224 g. of 1-hexadecene and 168 g. of propylene and was pressurized to 1000 pounds per square inch with dry nitrogen.

After the reactor was charged with the catalyst it was sealed, placed on the rocker (for agitation) and heated to 65° C. The olefin mixture was introduced into the reactor in small portions over a period of ¾ hour, maintaining a temperature of 65°±2° which temperature was maintained for an additional five hours. When cool the reactor was opened and found to contain a dark gelatinous mass. This was transferred to a flask containing three liters of 99% isopropyl alcohol. The mixture was refluxed for 48 hours, cooled to room temperature and filtered. The solid was washed with more isopropyl alcohol and dried. The product (71.5 g.) was a near white rubbery solid having an intrinsic viscosity of 2.2 (corresponding to a molecular weight of 100,000). Evaporation of the filtrate yielded 158 grams of liquid which proved to be, largely, hexadecene. Infra-red and ultraviolet analyses have shown that the product prepared above was a copolymer.

EXAMPLE II

*Propylene-Hexadecene Copolymer of Lubricating Oil Additive*

The propylene-hexadecene copolymer prepared above in Example I was blended in various concentrations into a mineral lubricating oil of SAE-20 grade obtained from Mid-Continent crude, and pour points, viscosities and viscosity indices were determined at tabulated below:

| Copolymer Conc., Wt. percent | Pour Point, ° F. | Viscosity Index | SSU Vis. @ 100° F. | SSU Vis. @ 210° F. |
|---|---|---|---|---|
| 0 | 15 | 101 | 354.6 | 56.1 |
| 0.1 | 15 | 105 | 389.8 | 58.9 |
| 0.5 | −30 | 107 | 419.0 | 61.1 |
| 1.0 | −35 | 118 | 500.1 | 69.6 |

The data set forth above show that the present copolymer is an effective viscosity index improver and pour depressant for mineral lubricating oils.

EXAMPLE III

*Air Filter Oil Containing Propylene-Hexadecene Copolymer*

In this example, an air filter oil was prepared in accordance with the present invention by dispersing 2.0 weight percent of the propylene-hexadecene copolymer in a mineral lubricating oil. The mineral lubricating oil was obtained from Gulf Coastal crude of naphthenic origin and had a viscosity of about 70 seconds at 210° F. and a viscosity index of about 60. For purposes of comparison, another air filter oil was prepared by dispersing 2.0 weight percent of polyethylene in the same mineral lubricating oil. The air filter oils were prepared by dispersing the polymeric materials in the mineral oil by stirring and heating for 2 hours to 330° F. In the case of the polyethylene, the product was rapidly cooled while with the copolymer the cooling rate was immaterial to optimum yield.

The two air filter oil compositions were then evaluated for their retention properties on a section of a full-scale wire mesh impingement-type air filter. A 7" x 7" x 2" section of a standard reusable coated impingement type air filter was employed in these retention tests. The standard air filter is manufactured by the Farr Company, model 11-47, and comprises a frame or housing provided with an air inlet, an air outlet and a maze of fine mesh wire screen arranged within the frame. The wire screen is quite similar to conventional window screens in mesh and wire diameter. The maze of wire screen in the standard filter occupies a volume of about 20" x 20" x 2".

In carrying out the retention tests, the aforementioned air filter section was dipped in the air filter oil composition being evaluated to thoroughly coat the section with the filter oil composition, the section removed from the air filter oil composition and allowed to drain for ½ hour at room temperature and thereafter conditioned for 1 hour by standing at a temperature of 200° F. Then the conditioned filter was stored for 20 hours at 200° F. and the loss of the air filter oil during the 20 hours of storage was measured. The ounces of air filter oil retained on the filter after conditioning and after 20 hours of storage at 200° F. on the 7" x 7" x 2" section were then extrapolated to a full size 20" x 20" x 2" air filter, the results being shown below:

| Filter Oil | 2% Propylene-Hexadecene Copolymer | 2% Polyethylene |
|---|---|---|
| Ounces of Oil Retained in Filter: | | |
| After conditioning | 22.0 | 18.8 |
| After 20 hours at 200° F | 10.5 | 7.2 |
| Decrease in ounces | 11.5 | 11.6 |
| Decrease, Percent | 52 | 62 |

The data set forth above show that the present copolymer dispersion is an excellent air filter oil. More particularly, it has excellent retention, sufficiently high dropping point and body to be retained on the filter, yet is not too high melting to prevent proper dipping or coating of the filter fibers.

EXAMPLE IV

*Use of Propylene-Hexadecene Copolymer in Chassis Lubricant*

A dispersion of 4 weight percent of the copolymer of the propylene-hexadecene copolymer of Example I in a mineral lubricating oil was then prepared by heating and stirring the mixture to 330° F. and then cooling rapidly to room temperature. The mineral lubricating oil in this case was obtained from Gulf Coastal crude of naphthenic origin and had a viscosity of about 55 seconds at 210 and 500 at 100° F. The resultant dispersion was a semi-solid, tacky, very adhesive to metal surfaces and water insoluble. This product was readily dispensable in the Lincoln automatic-multi-lubricator mechanism. Longer retention than that obtained with an aluminum stearate thickened grease was noted. A simple laboratory test showed the present product to be much more adhesive to metal surfaces under wet conditions. Two steel panels 2" x 18" were coated with a layer of the copolymer dispersion of the invention and the aluminum stearate grease. A stream of water at 125° F. was passed over the panels; in 3 minutes the panel coated with the aluminum stearate greases was completely clean. After 1 hour, the panel coated with the copolymer product still retained the lubricant in a noticeable quantity.

EXAMPLE V

*Propylene-Hexadecene Copolymer in Grease*

The propylene-hexadecene copolymer of Example I was then incorporated into a soap-thickened lubricating grease. For purposes of comparison, a similar grease was also prepared without the copolymer. These two greases had the following formulation:

| Formulation | I | II |
| --- | --- | --- |
| Glacial Acetic Acid | 12.0 | 10.0 |
| Coconut Acids [1] | 6.0 | 5.0 |
| Hydrated Lime | 9.8 | 8.2 |
| Phenyl α-naphthylamine | 0.5 | 0.5 |
| Mineral Lubricating Oil [2] | 71.7 | 73.0 |
| Copolymer (Propylene-Hexadecene) | | 3.3 |

[1] Consisting essentially of about 28% caprylic, 57% capric, 15% lauric acids.
[2] Same oil as in Example IV.

These greases were prepared as follows: Charged lime and mineral oil to a fire heated kettle and mixed to a fine slurry. Then added mixed acids (blend) and continued stirring. Then heated to 300° F. where the copolymer was added (to grease II) and continued heating to 475° F. Shut off heat, cooled to 200° F., added phenyl α-naphthylamine and cooled to 150° F. Gaulin homogenized at 6000 p.s.i. or at 150,000 seconds rate of shear.

The following properties were then evaluated for the two greases:

| Properties | I | II |
| --- | --- | --- |
| Appearance | Excellent smooth grease. | Excellent smooth stringy grease. |
| Dropping Point, °F | 500+ | 500+ |
| Penetration, 77° F., mm./10: | | |
| Unworked | 290 | 296. |
| Worked 60 strokes | 295 | 300. |
| Worked 100,000 strokes | 360 | 345. |
| Stringiness (length of string) | None | 3 inches. |
| Timken Test—40 lbs. soap | Pass | Pass. |

It will be noted that Grease II was an excellent grease having a high degree of stringiness which is highly desirable for retention and adhesion in automotive chassis parts and also acts as a sealing medium at the end of journal bearings to prevent entrance of dirt and water into the bearing. The addition of the copolymer to the grease also greatly increases the adhesiveness of the grease to metal surfaces. In addition, smaller quantities of the soap thickener are needed to give an equal thickness to the non-copolymer containing grease.

What is claimed is:

1. A lubricant composition comprising a major proportion of a lubricating oil and a minor proportion of a copolymer of a $C_{10}$ to $C_{24}$ monoolefin with propylene in the molar ratio of 0.5:1 to 8:1, said copolymer having a molecular weight in the range of 15,000 to 150,000 and having been prepared in contact with the catalyst system made up of a reducing metal compound and a reducible metal compound.

2. A lubricant composition comprising a major proportion of a lubricating oil and about 0.1 to 10.0% by weight, based on the total composition, of a copolymer having as constituent monomers (a) $C_{10}$ to $C_{24}$ monoolefin and (b) propylene in the molar ratio of about 0.5:1 to 8:1, said copolymer having a molecular weight in the range of 15,000 to 150,000 and having been prepared in contact with a catalyst system made up of a reducing metal compound and a reducible metal compound.

3. A lubricating oil composition comprising a major proportion of a mineral lubricating oil and about 0.1 to 1.0% by weight, based on the total composition, of a copolymer of propylene with hexadecene-1 in the molar ratio of about 0.5:1 to 8:1, said copolymer having a molecular weight in the range of 15,000 to 150,000 and having been prepared in contact with a catalyst system made up of a reducing metal compound and a reducible metal compound.

4. An oleaginous composition containing a major proportion of an oil of lubricating viscosity and about 2.0 to 5.0% by weight, based on the total composition, of a copolymer of propylene with a $C_{10}$ to $C_{24}$ monoolefin in the molar ratio of 1:1 to 5:1, said copolymer having a molecular weight in the range of 50,000 to 150,000 and having been prepared in contact with a catalyst system made up of a reducing metal compound and a reducible metal compound.

5. A lubricating grease composition comprising a major proportion of a mineral lubricating oil, a grease-making proportion of metal soap of fatty acid, and about 2.0 to 5.0% by weight based on the total composition of a copolymer of propylene with a $C_{10}$ to $C_{24}$ monoolefin in the molar ratio of about 0.5:1 to 8:1, said copolymer having a molecular weight in the range of 50,000 to 150,000 and having been prepared in contact with a catalyst system made up of a reducing metal compound and a reducible metal compound.

6. The lubricant of claim 1 wherein the catalyst system is made up of an organo-aluminum compound and a reducible compound of a metal of groups IVB, VB, VIB, and VIII of the periodic system.

References Cited in the file of this patent

UNITED STATES PATENTS

| | | |
| --- | --- | --- |
| 2,521,395 | Morway et al. | Sept. 5, 1950 |
| 2,522,455 | Lieber | Sept. 12, 1950 |
| 2,534,095 | Young et al. | Dec. 12, 1950 |
| 2,727,024 | Field et al. | Dec. 13, 1955 |
| 2,731,453 | Field et al. | Jan. 17, 1956 |
| 2,732,356 | Paxton | Jan. 24, 1956 |
| 2,746,925 | Garber et al. | May 22, 1956 |
| 2,762,775 | Foehr | Sept. 11, 1956 |

FOREIGN PATENTS

| | | |
| --- | --- | --- |
| 533,362 | Belgium | Nov. 16, 1955 |